Dec. 23, 1930. O. M. REXINGER Re. 17,911

WINDOW GRATING

Original Filed Dec. 28, 1926

Inventor;
Otto M. Rexinger,
per W. W. Crandall
Attorney.

Reissued Dec. 23, 1930

Re. 17,911

UNITED STATES PATENT OFFICE

OTTO M. REXINGER, OF BEVERLY HILLS, CALIFORNIA

WINDOW GRATING

Original No. 1,662,167, dated March 13, 1928, Serial No. 157,565, filed December 28, 1926. Application for reissue filed May 12, 1930. Serial No. 451,771.

In this specification, and the accompanying drawing, I shall describe and show a preferred form of my invention, and specially mention certain of its more important objects. I do not limit myself to the forms disclosed, since various changes and adaptations may be made therein without departing from the essence of my invention as hereinafter claimed; and objects and advantages, other than those specifically mentioned are included within its scope.

My invention relates to removable gratings for the protection of window openings and the like. Among its principal objects are; first, to provide an expansible grating that may readily be inserted between the jambs of a window casing beneath or above a raised or lowered sash; second, to furnish facilities for locking the grating in position to prevent its removal by unauthorized persons; third, to afford ready means for attaching canvas or other roller curtains on either or both sides of the grating at will; and, fourth, to supply a relatively simple and inexpensive device adapted to function in the ways just stated.

My objects are attained in the manner illustrated in the accompanying drawing, in which—

Figure 1:
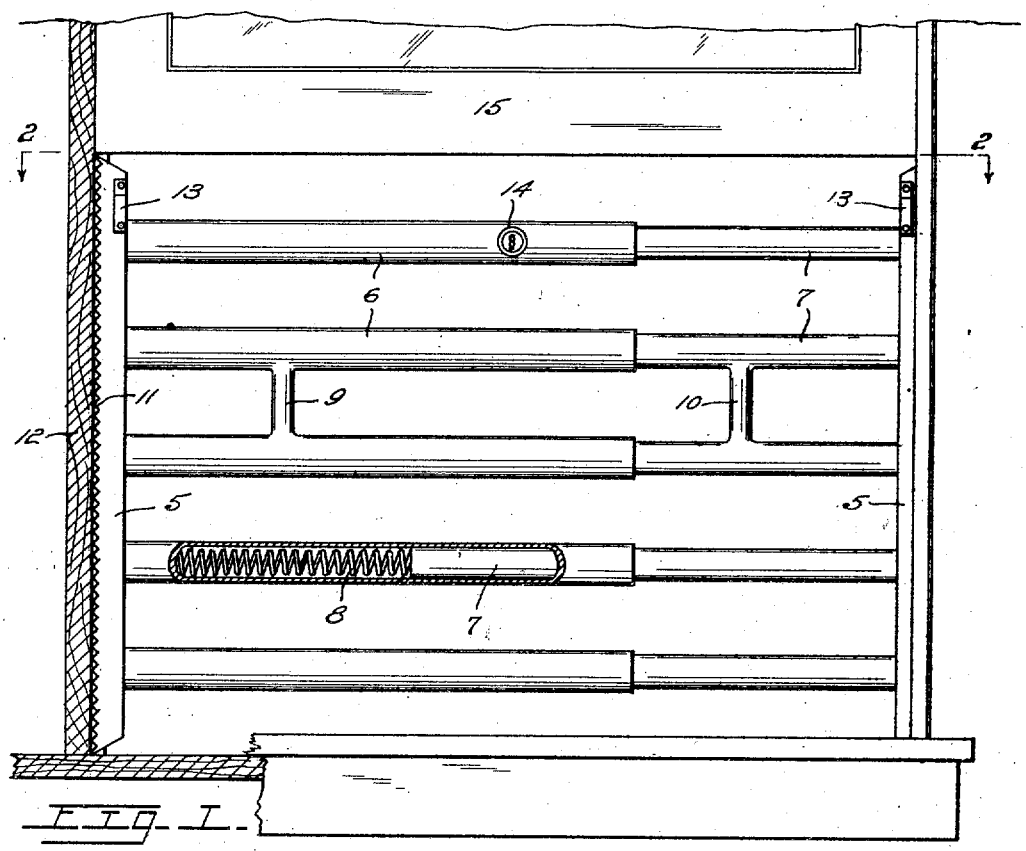
Figure 2:
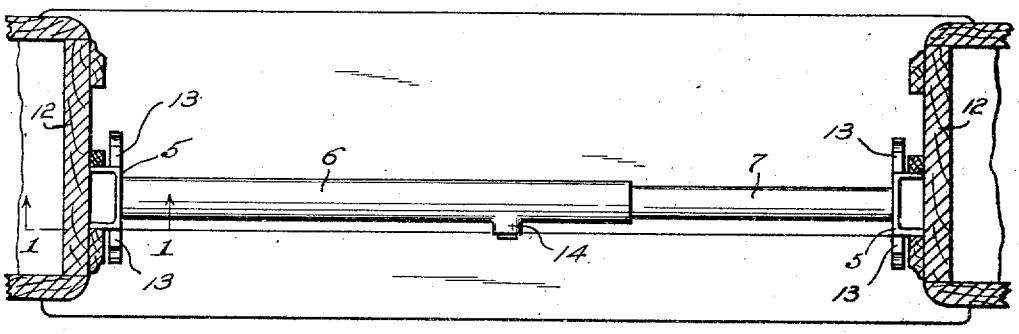

Figure 1 is an elevation of a window opening with a portion of the window frame at the left partially broken away, and with my improved grating installed therein beneath a sash; and Figure 2 is a horizontal section of the casing of the above window, taken on the line 2—2 of Figure 1, and with my device shown in plan in operative relation thereto.

Similar reference numerals refer to similar parts throughout the views.

My grating comprises a pair of variably spaced upright side members 5 spanned by a series of spaced telescoping bars. The latter consist of outer tubes 6, and inner bars 7. Within each of the outer tubes is a helical compression spring, as shown at 8. These springs press against the inner ends of bars 7 and tend to expel them from tubes 6, and thus force side members 5 apart. A cross bar 9 spans two of the tubes 6, and a similar cross bar 10 spans the corresponding pair of bars 7. These cross bars serve as grab-holds whereby the side members of the grating may be brought nearer to each other when the grating is to be installed or removed.

In the form of my invention selected for illustration the side members 5 are made of channel iron having a width only slightly less than the thickness of the window sash, so as to be able to enter the sash runway of the window frame. The edges of the channel flanges preferably are dendated as at 11, to enable them to better engage jambs 12 of the window frame. At the tops of the side members are brackets 13 adapted for supporting shade rollers when it is so desired. These brackets may be of any suitable and approved design and they may be placed either on the outside or inside of the grating, or on both sides as shown.

A locking mechanism of suitable type is provided at 14, whereby the grating may be locked in its extended position in the window frame to prevent it being removed by unauthorized persons.

The operation of my invention will be clearly apparent from the foregoing description when it is further stated that, to effectively protect a window opening thereby, all that is necessary is to raise the sash 15 and put my grating below it in the sash runways locking it in its extended position.

Having thus fully described my invention I claim:

1. A device of the character described, comprising a pair of variably spaced parallel side members; a plurality of spaced pairs of telescopic members connecting and aligning the side members; springs within the outer telescopic members adapted for pushing the inner telescopic members outwardly to separate the side members; and means for locking the telescopic members in extended position.

2. In combination, a pair of oppositely arranged grating sections, each section being composed of a rigid side member and a series of angularly-disposed spaced apart rails, means whereby the rails of one section are guided rectilinearly of the rails of the other section slidably, resilient means opposing the sliding of the rails of one section relatively to the rails of the other section, and means interposed between adjacent rails of both sections providing grabholds.

3. A device of the kind described consisting of a pair of oppositely arranged rigid bars engageable with window jambs, a series of parallel rails arranged at right angles upon each rigid bar, the rails of one bar being operatively and adjustably guided relatively to the rails of the other bar, interengageable locking parts associated with the adjustable rails of both bars and key operated to hold the adjustable rails against relative movement, and resilient means holding the bars normally their greatest distance apart and being compressible as the bars are moved towards each other.

4. In combination a pair of oppositely arranged window-engaging members, a pair of complemental wicket members each carried by a different window-engaging member, means for allowing one wicket member to move adjustably of the other to lengthen or to contract the combined wicket members, springs opposing the adjustment of the wicket members, reinforcing cross-bars connecting each wicket member and projecting as hand-holds whereby the wicket members may be forcibly moved towards or from each other, and a locking device carried by either wicket member and projecting a plunger into the other wicket member to hold both wicket members rigidly in adjusted position.

5. In combination with opposing window jambs, a pair of vertically arranged bars having serrations formed thereupon and penetrating the window jambs, a plurality of tubular rails extending at right angles from one bar, short of the opposite bar, a plurality of rails carried at right angles by the second bar, and projecting adjustably in the tubular rails, springs in the several tubular rails bearing at one end, each, against the bar and at its opposite end pressing the adjacent end of the second-named rails against the second bar to crowd the serrations of the bars into the jambs, and manually operated means for releasably holding the adjusted rails against collapsation.

6. A device of the kind described consisting of a grating section having hollow rails, a second grating section having solid rails adjustably mounted in the hollow rails for lateral movement, means carried terminally by both grating sections adapted to be anchored against window jambs of a window structure when the grating sections have been extended adjustably their greatest distances apart across the width of the window opening, resilient means holding the rails of both sections in extended relation, and locking means for locking the adjustable rails of both sections internally to prevent contracting the distance between the anchored means of both rails.

OTTO M. REXINGER.